(12) United States Patent
Ati

(10) Patent No.: US 11,882,384 B2
(45) Date of Patent: *Jan. 23, 2024

(54) IDENTIFICATION OF AUDIO CONFERENCE PARTICIPANTS

(71) Applicant: Zoom Video Communications, Inc., San Jose, CA (US)

(72) Inventor: Kameswar Rao Ati, Fairview, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,820

(22) Filed: Sep. 26, 2022

(65) Prior Publication Data

US 2023/0034603 A1 Feb. 2, 2023

Related U.S. Application Data

(63) Continuation of application No. 17/443,528, filed on Jul. 27, 2021, now Pat. No. 11,490,052.

(51) Int. Cl.
*H04N 7/15* (2006.01)
*G10L 17/00* (2013.01)

(52) U.S. Cl.
CPC .............. *H04N 7/15* (2013.01); *G10L 17/00* (2013.01)

(58) Field of Classification Search
CPC ........... H04L 65/1093; H04L 65/403; G10L 17/00; H04N 7/15; H04M 3/567; H04M 3/42382; H04M 2201/38; H04M 2201/41; H04M 2201/36
USPC .......................................... 348/14.01–14.16
See application file for complete search history.

(56) References Cited

U.S. PATENT DOCUMENTS

| | | |
|---|---|---|
| 3,948,488 A | 4/1976 | Brockelsby |
| 4,736,929 A | 4/1988 | McMorris |
| 5,090,580 A | 2/1992 | Nelson |
| 5,431,526 A | 7/1995 | Peterson et al. |
| 5,522,582 A | 6/1996 | Dilks |
| 5,853,282 A | 12/1998 | Bechler et al. |
| 6,138,991 A | 10/2000 | Myers, Jr. |
| 6,631,886 B1 | 10/2003 | Caudle et al. |
| 6,830,423 B1 | 12/2004 | Williams et al. |
| 7,377,740 B2 | 5/2008 | Panzarella et al. |
| 7,792,257 B1* | 9/2010 | Vanier ............ H04M 15/08 379/218.01 |

(Continued)

FOREIGN PATENT DOCUMENTS

| | | |
|---|---|---|
| EP | 2888976 A1 | 7/2015 |
| GB | 2431631 A | 5/2007 |

(Continued)

OTHER PUBLICATIONS

How can we help you?, What is an "unidentified caller"?, https://support.goto.com/meeting/help/feature-overview-unidentified-callers-g2m090098#:~:text=Anyone%20who%20dials%20in%20to,%22Caller%20%5BX%5D%22, Jul. 26, 2021, 3 pages.

(Continued)

*Primary Examiner* — Melur Ramakrishnaiah
(74) *Attorney, Agent, or Firm* — Young Basile Hanlon & MacFarlane, P.C.

(57) ABSTRACT

An audio-only caller is determined to be accessing a conference using a landline phone. The audio-only caller is prompted to provide name information via a text-based message. A response that includes the name information is received. The name information is displayed via a user interface of the conference.

20 Claims, 11 Drawing Sheets

(56) References Cited

U.S. PATENT DOCUMENTS

| | | | |
|---|---|---|---|
| 7,798,761 B2 | 9/2010 | Goodrich et al. | |
| 8,060,366 B1* | 11/2011 | Maganti | H04L 12/1827 |
| | | | 704/251 |
| 8,231,109 B2 | 7/2012 | Peng | |
| 8,720,865 B2 | 5/2014 | Anderson et al. | |
| 9,415,981 B2 | 8/2016 | Heravi et al. | |
| 10,623,575 B1 | 4/2020 | Synal | |
| 10,630,843 B1* | 4/2020 | Rosenberg | H04L 63/0428 |
| 2003/0108189 A1* | 6/2003 | Barzani | H04M 1/665 |
| | | | 379/373.02 |
| 2004/0208303 A1 | 10/2004 | Rajagopalan et al. | |
| 2005/0053213 A1* | 3/2005 | Giannoit | H04M 3/54 |
| | | | 379/221.13 |
| 2007/0246436 A1 | 10/2007 | Picard et al. | |
| 2008/0181140 A1* | 7/2008 | Bangor | H04L 65/403 |
| | | | 370/261 |
| 2014/0362742 A1* | 12/2014 | Martinez | H04L 12/1818 |
| | | | 370/262 |
| 2015/0012278 A1* | 1/2015 | Metcalf | G06Q 30/0201 |
| | | | 704/270.1 |
| 2015/0307332 A1 | 10/2015 | Huang | |
| 2021/0201916 A1* | 7/2021 | Touret | G10L 15/26 |

FOREIGN PATENT DOCUMENTS

| | | |
|---|---|---|
| KR | 101296890 B1 | 8/2013 |
| WO | 2005053178 A1 | 6/2005 |

OTHER PUBLICATIONS

How can we help you?, How do I manage unidentified callers?, https://support.goto.com/meeting/help/manage-unidentified-callers-desktop-app-g2m090067, Jul. 26, 2021, 2 pages.

* cited by examiner

IDENTIFICATION OF AUDIO CONFERENCE PARTICIPANTS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for identifying audio conference participants.

A first aspect is a method that includes determining that name information of an audio-only caller accessing a first conference at a first time is unknown; storing the name information in a record responsive to obtaining the name information from a device of the audio-only caller; displaying the name information in a first user interface element of the first conference, where the first user interface element is associated with the audio-only caller; retrieving the name information from the record responsive to the audio-only caller accessing a second conference at a second time after the first time; and displaying the name information in a second user interface element of the second conference associated with the audio-only caller.

A second aspect is an apparatus that includes a memory and a processor. The processor is configured to execute instructions stored in the memory to receive, from a first device, a request for an audio-only caller to join a conference; determine that name information of the audio-only caller accessing the conference at is unknown; store the name information in a record responsive to obtaining the name information from a second device of the audio-only caller; and display the name information in a user interface element of the conference associated with the audio-only caller.

A third aspect is a non-transitory computer readable medium storing instructions operable to cause one or more processors to perform operations that include determining that name information of an audio-only caller accessing a first conference using a device is unknown; obtaining, in response to an identification request, the name information of the audio-only caller, where the identification request is based on a type of the device, where the identification request is one of a text-based message or an audio message, and where the type of the device is one of a landline phone or a mobile phone; and displaying the name information in a first user interface element of the first conference, where the first user interface element is associated with the audio-only caller.

A fourth aspect is a method that includes determining that an audio-only caller is accessing a conference using a landline phone; prompting, via a text-based message, the audio-only caller to provide name information; receiving a response that includes the name information; and displaying the name information via a user interface of the conference.

A fifth aspect is a device that includes a memory and a processor. The processor is configured to execute instructions stored in the memory to determine that an audio-only caller is accessing a conference using a landline phone; prompt, via a text-based message, the audio-only caller to provide name information; receive a response that includes the name information; and display the name information via a user interface of the conference.

A sixth aspect is a non-transitory computer readable medium storing instructions operable to cause one or more processors to perform operations that include determining that an audio-only caller is accessing a conference using a landline phone; prompting, via a text-based message, the audio-only caller to provide name information; receiving a response that includes the name information; and displaying the name information via a user interface of the conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
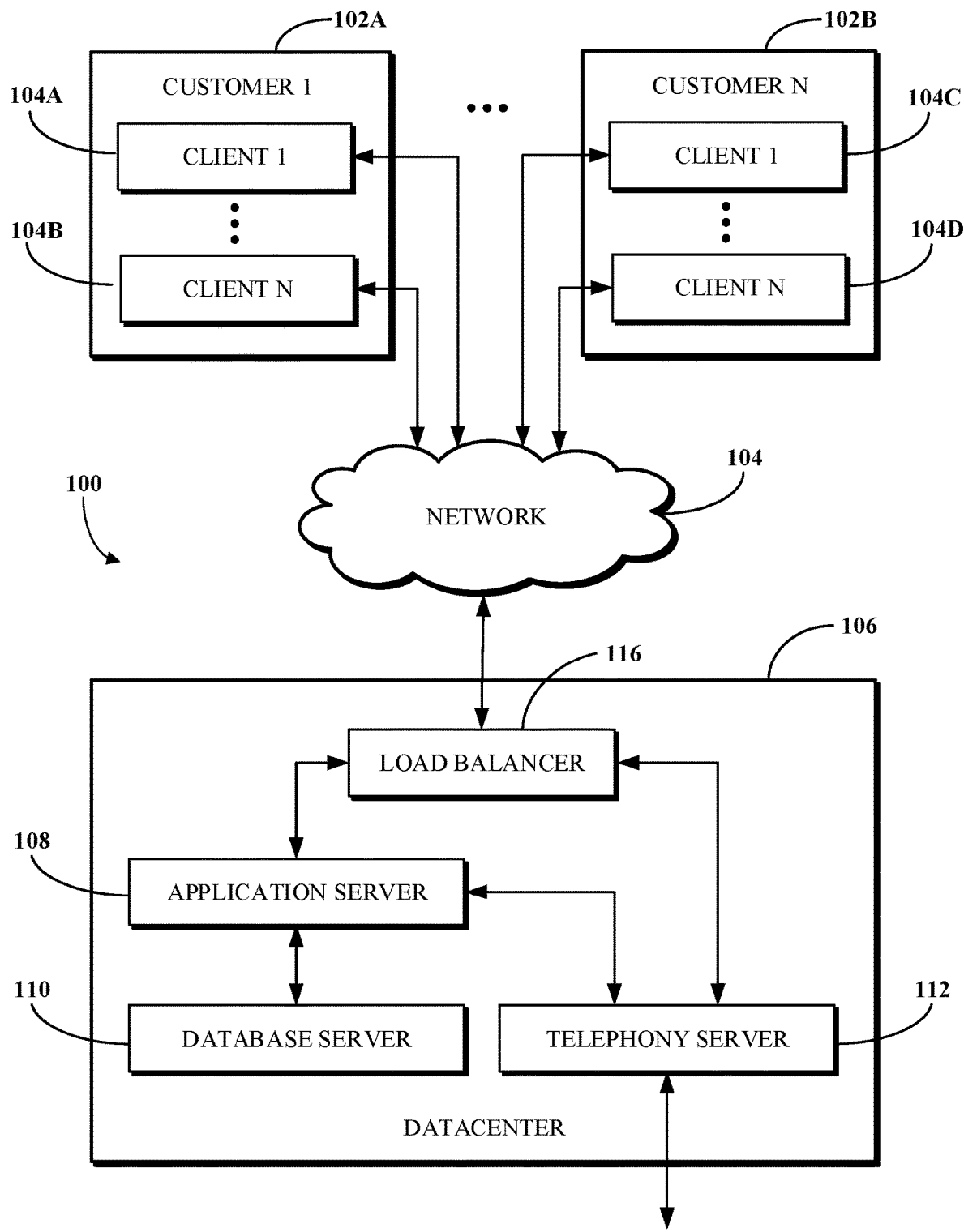
FIG. 1 is a block diagram of an example of an electronic computing and communications system.

In a software platform, such as a UCaaS platform, a user (e.g., a host) may set up (e.g., schedule, etc.) a conference. Conference details for joining the conference may be sent to, or otherwise obtained by, users who can use the conference details to join the conference. The conference details may include a telephone number, a hyperlink, a unique conference identification number, more, fewer, other detail, or a combination thereof that a user can use to join the conference.

A user interface (e.g., of a conferencing application, etc.) may be available to conference participants to, inter alia, view the list of participants in the conference. To illustrate, and without limitations, the user interface may display respective representations of the conference participants. A representation of a participant can be or include an identifier of the participant. The identifier of a participant can be or include name information of the participant. When name information of a participant is unknown, another representation of the participant may be shown, for example, a whole or a partial phone number associated with a device that the participant is using to connect to the conference. As further described below, it is desirable to display name information for the participants as opposed to any other representation.

Several conventional mechanisms for obtaining name information from conference participants may be available. For example, a conferencing software may permit a user to optionally enter an identity of the user. For example, the user may navigate to an online form (e.g., a web form) that enables the user to join the conference where the user can optionally provide (e.g., input, etc.) the name information. In another example, the user may access the conference through a client application, which optionally allows the user to enter an identity of the user. The identity of the user, if provided, may be displayed in the user interface associated with the conference so that the other participants can identify the user. Additionally, in the process of joining the conference, the user may be prompted to speak his/her name so that the user can be announced, such as to the already joined participants of the conference. However, in such a case, the name of the user may not be associated with the user in the user interface associated with the conference.

In some situations, the user may be an audio-only caller who may be joining the conference via a telephony connection. Conference participants may wish to join via a telephony connection for several reasons or under different circumstances including, but not limited to: the conference itself being configured to be an audio only conference; the user being unable (such as due to network connectivity issues, user error, etc.) to join the conference via a client application; the call quality being better using a telephony connection (as compared to, for example, a Web Real-Time Communication (WebRTC)); the user desires to join the conference hands free (such as using a Bluetooth device); meeting/video fatigue causing the user to join by phone; or some other reason for which the user decides to join the conference using a telephony connection as opposed to a client application on a computer.

The above describes techniques for obtaining name information from a participant may not be available to some participants, such as an audio-only caller. An audio-only caller is conference participant that joins or attempts to join a conference using a telephony connection. It may be difficult or impossible for the audio-only caller to enter an identity at the time of joining or after joining the conference using the above-described conventional techniques.

Conference hosts (and other conference participants) may prefer (and sometimes require) that the identities of conference participants, including those who join using telephony connections, are known. Furthermore, at least some regulated industries (such as financial services, education, government, and other regulated industries) require de-anonymizing call-in (i.e., audio-only) callers.

Implementations according to this disclosure address problems such as these by determining that name information of an audio-only caller accessing a conference is unknown, obtaining the name information from a device of the audio-only caller, and displaying the name information in a user interface element of the first conference associated with the audio-only caller. In an example, an identification request may be transmitted to the audio-only caller accessing the conference, and name information of the audio-only caller may be received from the audio-only caller in response to the identification request. In an example, the identification request may be transmitted to the audio-only caller in response to determining that the name information of the audio-only caller is unknown. The name information obtained from the audio-only caller can be stored in a record. In an example, the name information can be retrieved from the record responsive to the audio-only caller accessing a subsequent conference at a second time after a first time of the conference. The modality (e.g., type) of the identification request can depend on the type of the device (or type of connection) that the audio-only caller is using to join the conference. The name information of the audio-only caller is displayed in the user interface of the conference therewith de-anonymizing the audio-only caller, enabling the other participants, including the host, the identity of the audio-only caller using the name information, and enabling the other participants to specifically identify the audio-only caller when the audio-only caller speaks.

To illustrate, and as further described below, the audio-only participant may be using a mobile phone to dial into a conference using a public switched telephone network (PSTN) number associated with the mobile phone. Responsive to determining that the device of the audio-only caller is a mobile phone, a text-based identification request (e.g., a Short Message Service (SMS) message) may be transmitted to the audio-only caller prompting the audio-only caller to respond with an identity (e.g., a first and a last name). A user interface associated with the conference (e.g., the conference application of the host) may be updated to display the identity of the audio-only caller. As another example, and as further described below, responsive to determining that the audio-only caller is using a landline, an audio-based identification request (e.g., a voice prompt) may be transmitted to the audio-only caller prompting the audio-only caller to speak an identity. The voice response of the audio-only caller is transcribed to text that and displayed in a user interface associated with the conference. Other non-limiting ways of obtaining the identity of the audio-only caller are further described herein.

To describe some implementations in greater detail, reference is first made to examples of hardware and software structures used to implement audio conference participant identification. Unless otherwise specifically indicated or is clear from the context, the terms identity and name information are used interchangeably; and the terms user, participant, and conference participant are used interchangeably.

FIG. 1 is a block diagram of an example of an electronic computing and communications system (i.e., a system 100), which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
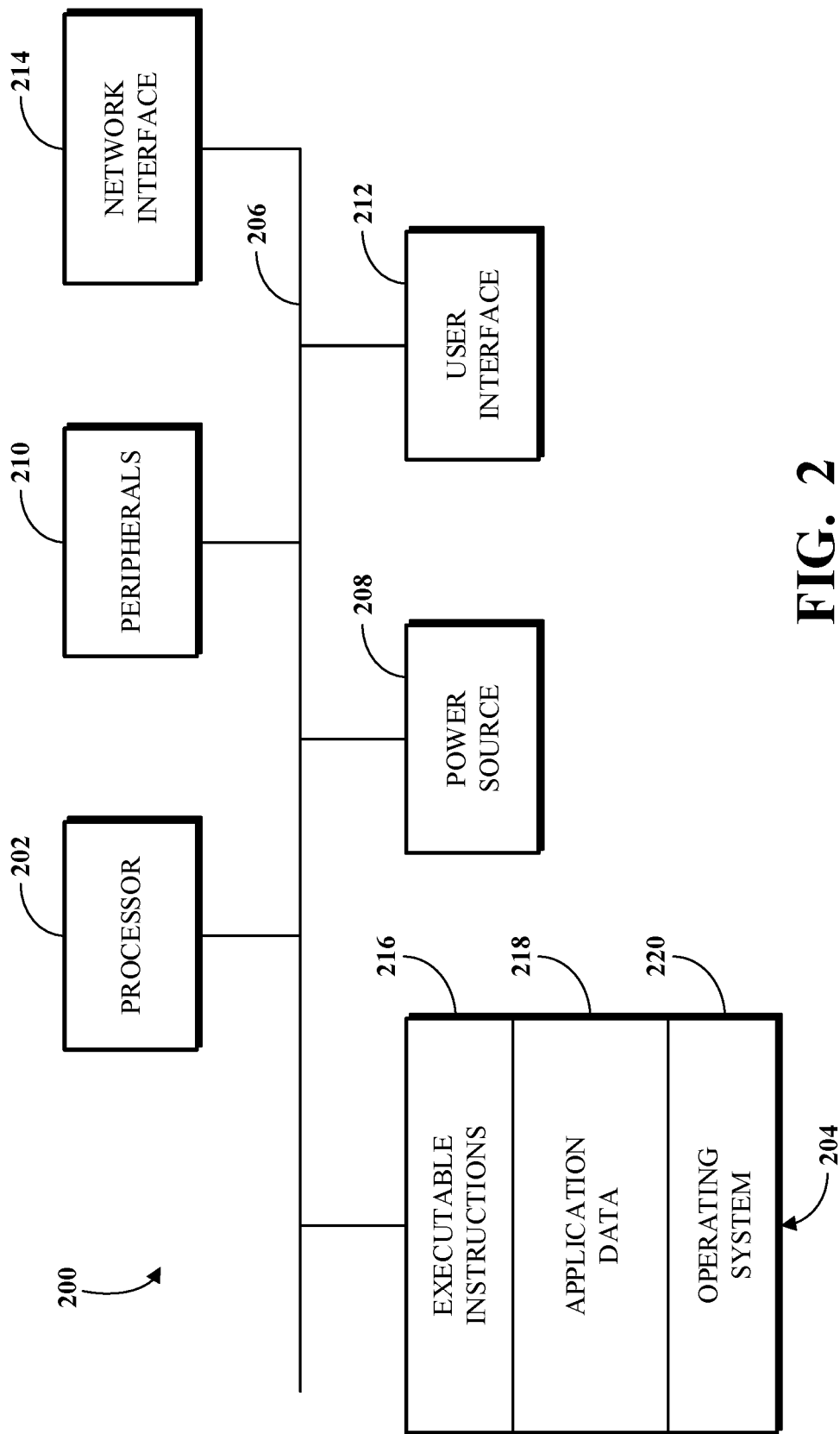
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 may provide power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee), infrared, visible light, general packet radio service (GPRS), global system for mobile communications (GSM), code-division multiple access (CDMA), Z-Wave, another protocol, or a combination thereof.

Figure 3:
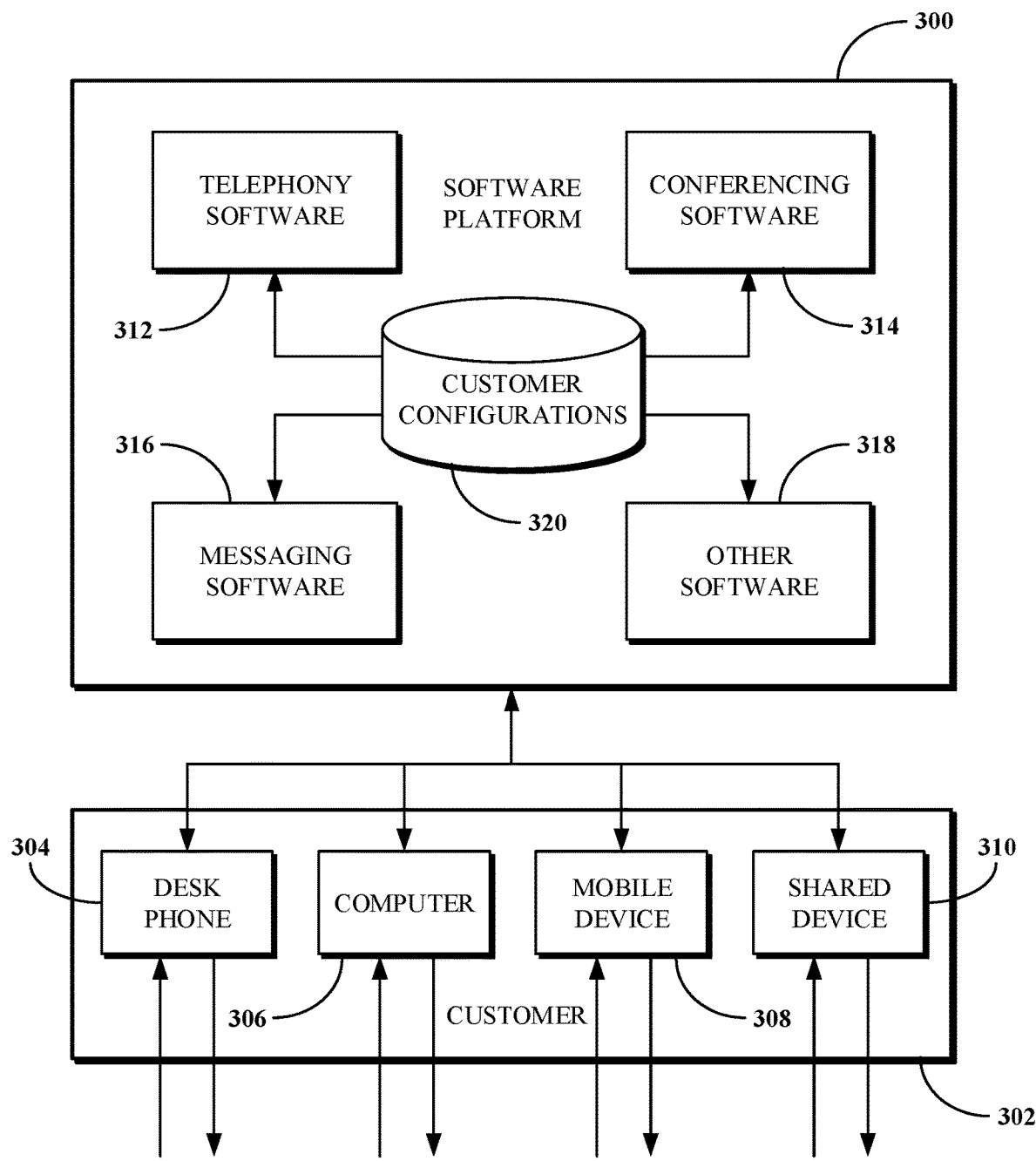
FIG. 3 is a block diagram of an example of a software platform implemented by an electronic computing and communications system.

FIG. 3 is a block diagram of an example of a software platform 300 implemented by an electronic computing and communications system, such as the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include mechanisms or techniques for identifying audio conference participants.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
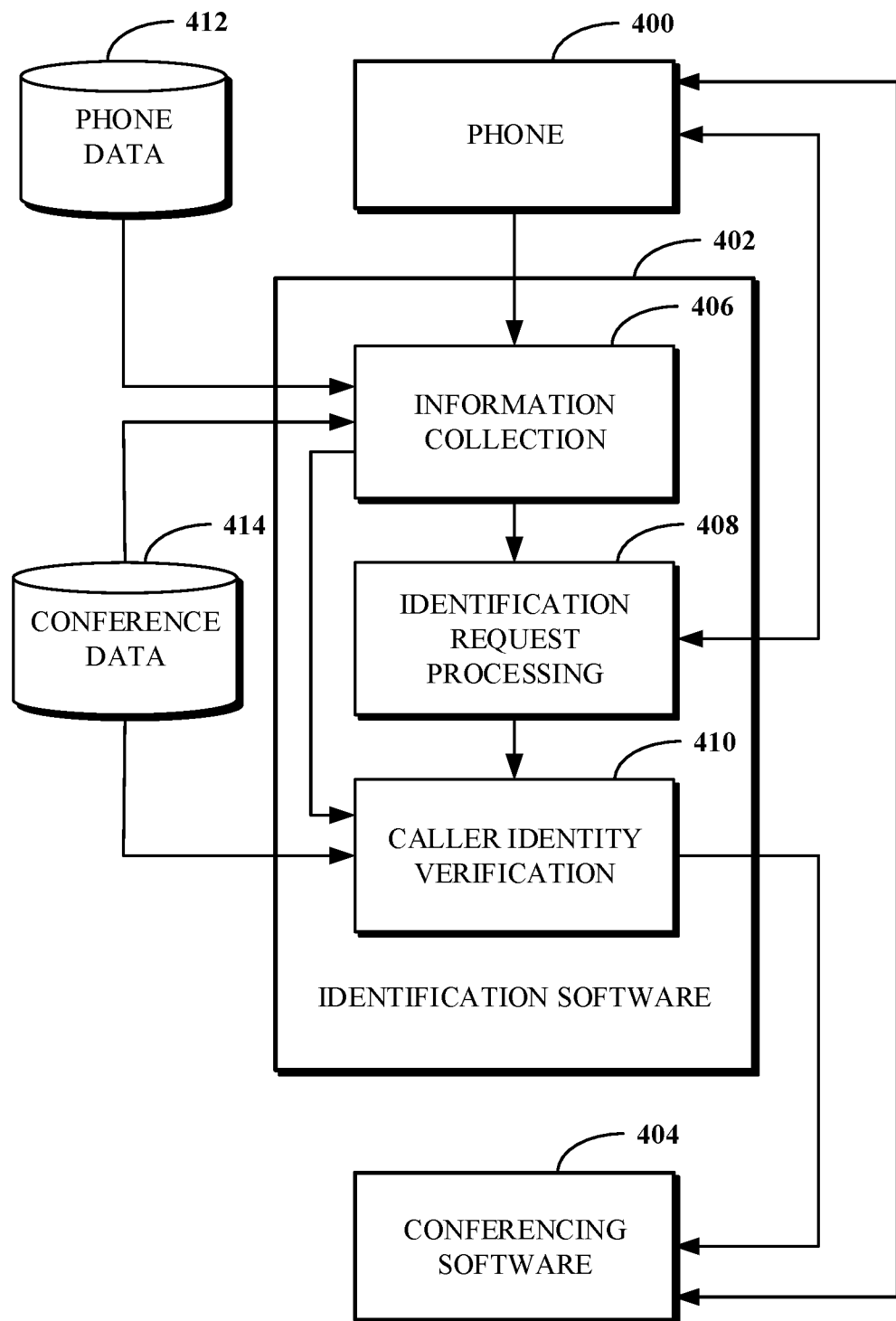
FIG. 4 is a block diagram of an example of identifying an audio-only caller to a conference.

FIG. 4 is a block diagram of an example of identifying an audio-only caller to a conference. A conference, as used herein, and unless the context indicates otherwise, refers to any real-time interaction that occurs over a network between two or more persons and where a participant can use a phone or other device to join (whether only as an observer/listener or as a contributor) the conference, such as by connecting to a service implementing the conference over audio and/or video channels. A conference encompasses services provided by the software platform 300 of FIG. 3, such as by at least the telephony software 312 or the conferencing software 314. Examples of conferences include but are not limited to a video-enabled virtual conference room, an audio-only conference call, a person-to-person call, and the like. The audio-only caller may be the operator of a phone 400 (i.e., a phone device) that the audio-only caller uses to connect to the conference.

The phone 400, which may, for example, be the desk phone 304, the computer 306, the mobile device 308, or the shared device 310 shown in FIG. 3, transmits a request received by an identification software 402 of the operator of the phone 400 (e.g., the audio-only caller) to join the conference implemented by a conferencing software 404, which may be or may be implemented by the software platform 300 of FIG. 3. For example, the conference can be provided or implemented by the telephony software 312, the conferencing software 314, or some other service of the software platform 300. To illustrate, and without limitations, in the case that the phone 400 is the computer 306 of FIG. 3, the phone 400 can include a telephony application that the user can use to call into the conference as an audio-only caller, such as a softphone.

Identifying the audio-only caller can mean associating name information (e.g., a label, a name, an identifying string, etc.) with the audio-only caller where the name information may be received from the audio-only caller or obtained from a record. The name information can be displayed in a user interface associated with the conference. The name information can be displayed in a user interface element of the user interface where the user interface element is associated with the audio-only caller. To illustrate, and without limitations, a host (or of the conference) or other participants of the conference may use respective user interfaces associated with the conference to identify (e.g., view the name information of) the audio-only caller based on a display of the name information of the audio-only caller in the user interface element associated with the audio-only caller.

The name information of the audio-only caller, as used herein, is not a generic label (e.g., "unknown caller," "unidentified caller," or some other such label) or the phone number (or partial phone number) of the audio-only caller (e.g., "XXX-XXX-1234," "961-123-9876," or some other such phone number or partial phone number) or some other such label that may be inferred or derived by the identification software 402 where the identity is not obtained by the identification software 402 (such as from the audio-only caller or a record) as described herein. Rather, the name information is information specific to the audio-only caller and which is usable by other conference participants to recognize an identity of the audio-only caller. As such, the name information can be or can encompass any identification information, such as an employee number, a title, or any other identifier usable to represent (e.g., identify) the participant other than his or her name. As further described herein, the identity may be previously obtained from the audio-only caller and stored in a record.

The identification software 402 is software that processes the request for the operator of the phone 400, who is an audio-only caller accessing the conference over a telephony connection, and obtains the name information of the audio-only caller. In some examples, the name information may be obtained before the audio-only caller is joined to the conference. Joining the audio-only caller to the conference can mean adding the user as a participant (e.g., a listener, a contributor, a speaker, etc.) of the conference. Joining the audio-only caller can include opening an audio channel between a device of the audio-only caller and the conferencing software to cause the device of the audio-only caller to transmit audio (e.g., audible by other participants) to and receive audio (e.g., spoken by other participants) from the conferencing software.

In some examples, the name information may be obtained after the audio-only caller is joined to the conference. In an example, the identity is obtained before the audio-only caller is allowed to join the conference at the conferencing software 404. In another example, the audio-only caller may be placed in (e.g., joined to, etc.) the conference before the audio-only caller provides the identity. In an example, the audio-only caller may be joined to the conference in such a way that the audio-only caller cannot hear other participants of the conference until the audio-only caller provides the identity. In another example, the audio-only caller may additionally be joined to the conference in mute mode such that the audio-only caller cannot be heard by the other participants of the conference until the identity of the audio-only caller is obtained by the identification software 402. In an example, responsive to the audio-only caller (i.e., the operator) not providing the identity when prompted, the identification software 402, or a component therein, can remove the audio-only caller from the conference.

The identification software 402 and the conferencing software 404 may be implemented by different servers or by the same server, for example, the application server 108 shown in FIG. 1. As shown, the identification software 402 is separate from the conferencing software 404. However, in some implementations, the identification software 402 may be included in the conferencing software 404. In an example, and as already described, the identification software 402 may represent a threshold check process performed at the conferencing software 404 itself for obtaining the name information of an audio-only caller, such as before allowing the audio-only caller to join a conference, before allowing the audio-only caller to participate in (e.g., hear, or be heard by, the other participants of) the conference. However, that need not be the case and the name information may be obtained after the audio-only caller is joined to the conference.

As shown, the identification software 402 includes an information collection tool 406, an identification request processing tool 408, and a caller identity verification tool 410. However, in some implementations, the identification software 402 may include other tools in addition to or instead of the tools 406 through 410. In some implementations, the identification software 402 may not include the caller identity verification tool 410 or may not perform functions similar to those described with respect to the caller identity verification tool 410.

The information collection tool 406 obtains information associated with the phone 400 and a conference identifier associated with the conference the audio-only caller is requesting to join. The conference identifier is some information for uniquely identifying a particular conference implemented at or by the conferencing software 404. The information associated with the phone 400 may include one or more of caller ID information, contact record information, proximity information, device owner information, other information, or a combination thereof.

In some cases, the information associated with the phone 400 and the conference identifier are both obtained within the request for the audio-only caller to join the conference received from the phone 400. For example, the request for the audio-only caller to join the conference can include the conference identifier, and the information collection tool 406, responsive to the request for the audio-only caller to join the conference, can transmit a request to obtain the information associated with the phone 400.

The request to obtain the information associated with the phone 400 can be transmitted to the phone 400, some other phone information source (not shown), the phone data database 412, or a combination thereof. In an example, the conference identifier is received from the phone 400 and at least some of the information associated with the phone 400 is received from a phone data database 412. For example, the phone data database 412 can store information associated with phones which have previously been used to join a conference at the conferencing software 404. The phone data database 412 may, for example, be implemented by the database server 110 shown in FIG. 1. In an example, the phone data database 412, or some other database that the identification software 402 can use, can include information regarding whether the phone 400 is a shared phone (e.g., the shared device 310 shown in FIG. 3). A shared phone may be used by more than one user. The illustrate, and without limitations, a shared phone can be a phone that is placed in a conference room, a phone that is placed in an office that may be shared by multiple persons, a hotel room phone, a hoteling workspace, a loaner phone, or the like.

In an example, the phone information source may be a service that the identification software 402 can query (e.g., use, interrogate, call, etc.) to obtain information about the phone 400, such as whether the phone 400 (or more accurately, the phone line of the phone 400) is a landline, a cellular/mobile phone, or the like. An example of the phone information source can be a phone-number-validator service, which uses a Location Routing Number (LRN) database. A LRN database can be used by a telephone company to determine how to route a call to/from the phone 400. The LRN database can include information that distinguishes the line type (mobile or landline). In another example, the phone information source can be a reverse phone number lookup service, which the identification software 402 can use to obtain information about the phone number of the phone 400, such as a name and an address of the holder of the phone number and the type of line.

In another example, a conference data database 414, which includes information associated with guests who are invited to join conferences, can include information associated with phones of those guests, who may be audio-only callers. The conference identifier received from the phone 400 can be used to search through the conference data of the conference data database 414 for information associated with the conference corresponding to the conference identifier received from the phone 400. That information associated with the conference may, for example, include at least some information associated with the phone 400. In some cases, the information associated with the phone 400 obtained from the conference data database 414 may be used to search the phone data database 412 for other aspects of the information associated with the phone 400.

The identification request processing tool 408 transmits an identification request (e.g., prompts the audio-only caller using a message) to obtain an identity of the audio-only caller to the phone 400 and receives a response to the identification request from the phone 400. The identification request may be a request for the identity of the audio-only caller based on the request for the audio-only caller to join the conference received from the phone 400. In some cases, the identification request may be a text-based request (e.g., a text-based message), an audio request (e.g., an audio message), some other type of message, or a combination thereof. The type (e.g., modality) of the request that the identification request processing tool 408 uses can depend on the capabilities (e.g., type, features, etc.) of the phone 400 as determined by the information collection tool 406. The response that the audio-only caller provides to the identification request can include or can be used as the identity of the audio-only caller. In some examples, and as further described below, an initial request may be transmitted to the phone 400 where the response to the initial request can be used to transmit the identification request to the audio-only caller.

With respect to text-based messages, the identification request processing tool 408 may transmit a SMS message (e.g., a text message), an email message, or the like to the phone 400. In an example of transmitting an email message, the phone number of the phone 400 and the carrier of the phone number can be used to formulate an email address to send the identification request to. To illustrate, the email address can be of the form 10-digit-phone-number@carrierdomain.com, where examples of carrierdomain include txt.att.net, messaging.nextel.com, vtext.com, and the like, depending on the carrier of the phone number of the phone 400.

In an example, the test-based message can include a hyperlink (e.g., a Uniform Resource Locator (URL)) to a form (e.g., a web-based form). The form can include one or more fields for the audio-only caller to provide the identity and submit the form. Several techniques are possible for conveying the information in the submitted form to the identification software 402. To illustrate, and without limitations, the form may include hidden data that a web server that receives and processes the submitted form can use to transmit the identity to the identification software 402. In any case, the identification request processing tool 408 can obtain the identity of the audio-only caller from the submitted form. In an example, the text-based message can include a hyperlink to an IDentity Provider (IdP), which can provide user authentication as a service. The IdP can include information, including respective names, of users registered with the IdP. As such, responsive to the audio-only caller signing in to the IdP in response to the text-based request, the identification request processing tool 408 can obtain the identity of the audio-only caller from the IdP.

With respect to audio messages, the identification request processing tool 408 can prompt, using an audio message, the audio-only caller to speak a name for the audio-only caller. In an example, based on information identified by the information collection tool 406, the identification request processing tool 408 determines that the phone 400 is not capable of receiving text-based messages. Responsive to the determination, the identification request processing tool 408 prompts, using an audio message, the audio-based caller to provide the identity of the audio-only caller.

The caller identity verification tool 410 can be used to verify the identity of the audio-only caller. Verifying the identity of the audio-only caller can include verifying that the identity of the audio-only caller has been received, which can include verifying that the identity is a valid identity. The conference may be configured to allow or deny the request for the audio-only caller to join the conference at the conferencing software 404 based on whether the audio-only caller provides an identity or whether the identity of the audio-only caller is known (e.g., previously provided by the audio-only caller). The caller identity verification tool 410 verifies the identity of the audio-only caller (e.g., that an identity of the audio-only caller has been received) based on the response to the identification request received from the phone 400, and, optionally based also on the information associated with the phone 400 and/or the conference identifier received from the phone 400.

Verifying the identity of the audio-only caller based on the response to the identification request includes determining whether the response to the identification request includes text data which may identify the identity of the audio-only caller. For example, the response to the identification request may be parsed to search for data that be used as the identity of the audio-only caller. The verification is successful where the caller identity verification tool 410 determines that the response to the identification request includes the identity.

The verification fails where the response to the identification request omits an identity of the audio-only caller. To illustrate, and without limitations, the response may be parsed to exclude portions not indicative of the identity. For example, the audio-only caller may respond with "my name is Raja Miller." The caller identity verification tool 410 can exclude from the response terms or utterances not considered to be part of the identity (such as "my name is"). In an example, the caller identity verification tool 410 may parse the response to determine whether the provided identity in the response may be fictitious (e.g., unreal, etc.). To illustrate, and without limitations, the audio-only caller may respond with "my name is Daffy Duck." As such, the caller identity verification tool 410 can determine that the provided identity is unreal. Fictitious names may include names of celebrities, deceased persons, famous persons, notorious persons, or the like.

Verifying the identity of the audio-only caller based on the response to the identification request and based on the information associated with the phone 400 and/or the conference identifier received from the phone 400 can also include verifying the conference identifier and at least some of the information associated with the phone 400. For example, the conference data database 414 can be searched for the conference identifier. The conference identifier may be successfully verified where the search of the conference data database 414 identifies an upcoming or in-progress conference associated with the conference identifier. The verification of the conference identifier fails where the search of the conference data database 414 does not identify such an upcoming or in-progress conference. In another example, the conference data database 414 can be searched for the conference associated with the conference identifier to identify information associated with invited guests of the conference. The information associated with the phone 400 may be successfully verified where at least some of that information is represented within the conference data database 414 record for the conference; otherwise, the verification of the information associated with the phone 400 fails.

Where a verification performed by the caller identity verification tool 410 is successful, the identity of the audio-only caller is deemed to have been successfully verified (e.g., successfully received). In such a case, the identity of the audio-only caller will be displayed within the conference. For example, where the identity verification tool 410 verifies the identity of the audio-only caller before the audio-only caller joins the conference, the request for the audio-only caller to join the conference is allowed in response to the identity verification, and the phone 400 is connected into the conferencing software 404 accordingly in which the name information of the audio-only caller is displayed within a user interface of the conference. In another example, where the identity verification tool 410 verifies the identity of the audio-only caller after the audio-only caller joins the conference, the name information of the audio-only caller may replace previously displayed information associated with the audio-only caller within a user interface of the conference. However, where at least one verification performed by the caller identity verification tool 410 fails, the identity of the audio-only caller is deemed to have failed. In such a case, the request for the audio-only caller to join the conference may be denied, and the phone 400 may be prohibited from connecting into the conferencing software 404. In cases where the audio-only caller is joined to the conference before the identity is received, the audio-only caller can be removed from the meeting if the verification performed by the caller identity verification tool 410 fails. In other cases, the request for the audio-only caller to join (or remain in) the conference is allowed even if the verification fails.

In some implementations, a failed verification by the caller identity verification tool 410 may prompt one or more subsequent identification requests. For example, upon the verification of the identity of the audio-only caller failing, a new identification request can be generated, and the operations performed by the identification request processing tool 408 and the caller identity verification tool 410 can be repeated until a successful verification of the identity of the audio-only caller or until a maximum number of unsuccessful attempts have been made, whichever occurs first.

Figure 5:
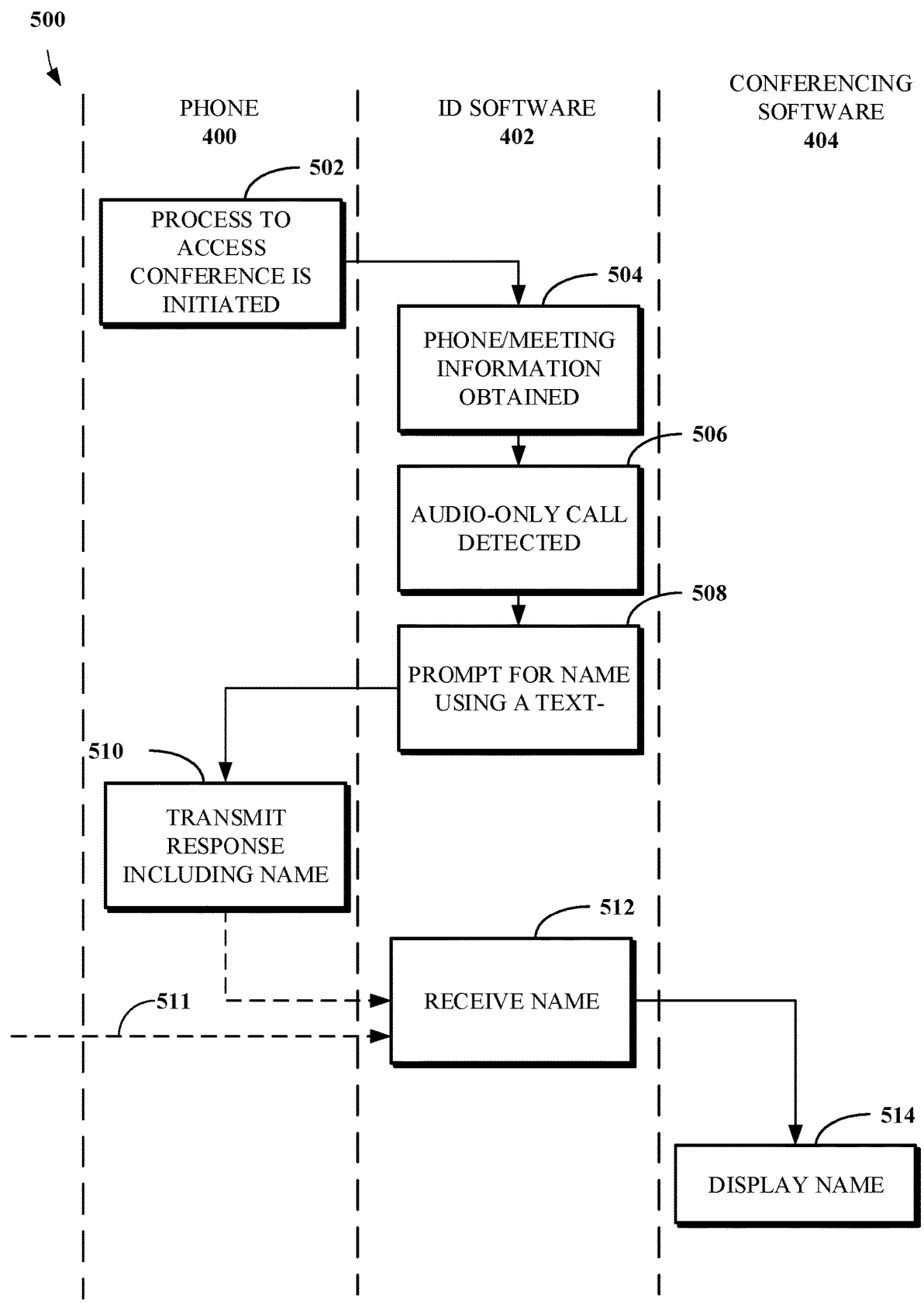
FIG. 5 is an illustration of an interaction diagram showing a first example sequence of operations performed for obtaining an identity of an audio-only caller.
Figure 6:
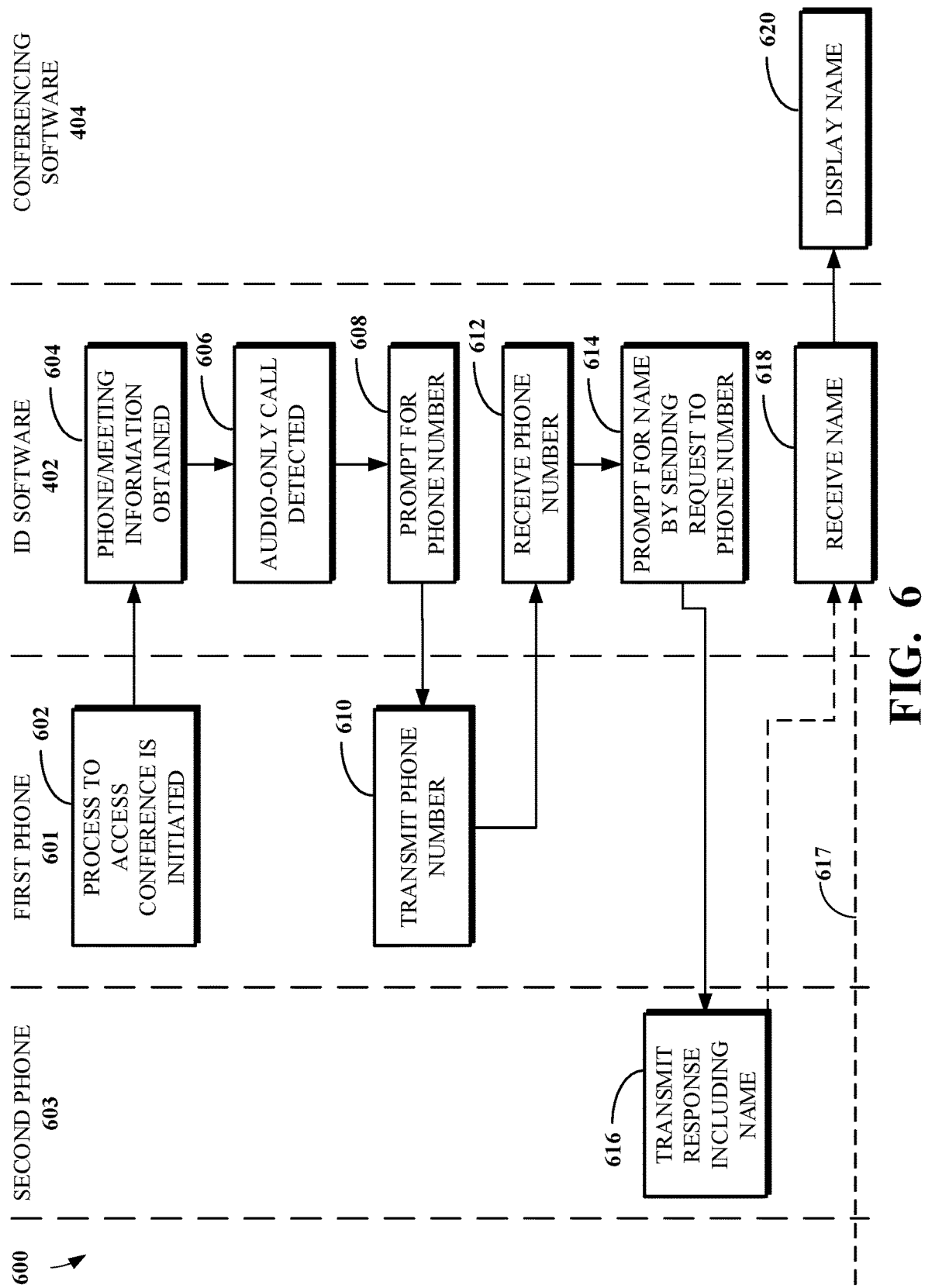
FIG. 6 is an illustration of an interaction diagram showing a second example sequence of operations performed for obtaining an identity of an audio-only caller.

FIGS. 5 and 6 are illustrations of interaction diagrams showing example sequences of operations performed between the phone 400 of the audio-only caller, the identification software 402, and the conferencing software 404 shown in FIG. 4. The interaction diagram 600 of FIG. 6 refers to the phone 400 as a first phone 601 and further includes a second phone 603, as further described below.

Referring first to FIG. 5, an interaction diagram 500 of first operations performed for obtaining an identity of the audio-only caller is shown. At 502, a process to access a conference is initiated by the phone 400. In an example, the process to access the conference may be initiated in response to a request to join a conference that is transmitted from the phone 400 to the identification software 402. In an example, the process to access the conference can be initiated after the audio-only caller is joined to the conference in response to the request to join the conference. At 504, information associated with the phone 400 are obtained at the identification software 402. The information associated with the phone 400 can be used to determine a type of the phone 400. The identification software 402 can determine whether the phone 400 is a landline or a mobile phone. More accurately, the identification software 402 determines whether the phone number associated with the phone 400 is a landline or a cellular/mobile number. The type of the phone 400 can be used to determine a request type of a request to be transmitted to the phone 400 to obtain the identity of the audio-only caller. Conference information, such as a conference identifier may also be obtained at the identification software 402.

In an example, the request to join the conference received at 502 may include the conference identifier. In another example, the identification software 402 (e.g., the information collection tool 406 therein) can prompt (such as via a voice prompt) the audio-only caller to provide the conference identifier. The audio-only caller may use a keypad of the phone 400 to enter the conference identifier or may utter the conference identifier. In either case, the conference identifier can be received at the identification software 402.

In an example, the identification software 402 can prompt (such as via a voice prompt) the audio-only caller to provide a participant code. The audio-only caller may use the keypad of the phone 400 to enter the participant code or may utter the participant code. In either case, the participant code can be received at the identification software 402. In some situations, the audio-only caller may also join the conference using a second device (such as a laptop, a desktop, a tablet, or some other such device). The conferencing software 404 can use the participant code to bind the phone 400 and the second device together in the conference so that, for example, when the audio-only caller speaks on the phone 400, a camera of the second device may be used to show a video of the audio-only caller in a user interface associated with the conference.

At 506, the identification software 402 determines that the request to join the conference is a request from an audio-only caller. For example, the identification software 402 determines that the request to join the conference is a request from an audio-only caller responsive to determining that the request is received from a phone number associated with the phone 400. Other ways of determining that the request to join the conference is a request from an audio-only caller are possible.

At 508, the identification software 402 transmits an identification request to the phone 400. The audio-only caller uses the phone 400 to respond to the identification request to provide an identity of the audio-only caller. As described above, the type (e.g., modality, etc.) of the identification request can depend on the capabilities (e.g., type, features, etc.) of the phone 400. In an example, the identification request can be, as described above, a text-based request or an audio request. While not specifically shown in the interaction diagram 500, the identification software 402 uses information about the phone 400 to determine the type of the identification request. In an example, responsive to the phone being capable of receiving text-based messages, the modality of the identification request can be a text-based message. In an example, the modality of the identification request can be an audio-based message, whether the phone is or is not capable of receiving text-based message.

At 510, and in an example, the phone 400 transmits a response received from the audio-only caller to the identification software 402. The response includes the identity of the audio-only caller. The type (e.g., modality, etc.) of the response may depend on the type of the request. If the request is a text-based message, then the response may be a text-based response. If the request is an audio-based message, then the response may be an audio-based response. To illustrate, the request may be the SMS message "Please text your First and Last Name" to which the audio-only caller responds to the SMS message with an SMS message "My name is Raja Miller" or "Raja Miller;" and the request may be the audio message "Please Say your First and Last Name" to which the audio-only caller responds to by saying, through the microphone of the phone 400 "My name is Raja Miller" or "Raja Miller."

At 512, the identification software 402 receives the identity or receives other information that can be used to obtain the identity of the audio-only caller. Receiving the identity can include verifying the received identity, as described above. As also described above and illustrated by an arrow 511, the response to the identification request may be received from an entity other than the phone 400. For example, information provided by the audio-only caller on a web form, and which include the identity, may be received by the identification software 402 from a web server that processes the submitted form. For example, authentication information of the audio-only caller may be received from an IdP, which the identification software 402 can use to obtain the identity of the audio-only caller.

At 514, the identity of the audio-only caller is displayed in a user interface associated with the conference. The identity can be displayed in a user interface element of the user interface where the user interface element is associated with the audio-only caller. The user interface can or can be part of a client application that, among other capabilities, displays a listing of the conference participants and their associated identities.

In some situations, the identification software 402 may not be able to verify the identity of the audio-only caller, as described above. In some examples, the audio-only caller may be joined to the conference even if the identity is not verified. As such, responsive to not receiving the identity, the identification software 402 can associate a generic label, as described above, with the audio-only label. In other examples, the audio-only caller may not be joined to the conference. As such, responsive to not receiving the identity, a message may be provided to the audio-only caller indicating that the audio-only caller will not be joined to the conference. To illustrate, and without limitations, the message can be "since we did not receive your name, you cannot join the conference. Goodbye." Whether an unidentified audio-only caller can be allowed to join a conference may depend on a configuration of the conference.

The identification software 402 can associate the verified identity of the audio-only caller with the phone 400, such as in the phone data database 412. More specifically, the verified identity of the audio-only caller can be associated with the phone number of the phone 400. When the audio-only caller attempts to join a subsequent conference using the phone 400, the identification software 402 determines whether the phone 400 is associated with an identity in the phone data database 412. Responsive to determining that the phone 400 is associated with an identity, the identification software 402 retrieves the identity from the phone data database 412 and uses the identity of display in the user interface associated with the subsequent conference. Responsive to determining that the phone 400 is not associated with an identity, the identity can be obtained as described herein (such as described starting at 508 of the interaction diagram 500).

Referring now to FIG. 6, an interaction diagram 600 of second operations performed for obtaining an identity of the audio-only caller is shown. Two phones (the first phone 601 and the second phone 603) are used in the interaction diagram 600. The first phone 601 can be the phone 400 of FIG. 4. The interaction diagram 600 illustrates obtaining the identity of the audio-only caller in a first case where the first phone 601 is not capable of receiving text-based messages or in a second case where the first phone 601 is a shared device.

At 602, a process to access conference is initiated by the first phone 601. For example, a request to join a conference may be transmitted from the first phone 601 to the identification software 402. At 604, which can be as described with respect to 504 of the interaction diagram 500, information associated with the first phone 601 are obtained at the identification software 402. At 606, which can be as described with respect to the operation 506 of the interaction diagram 500, the identification software 402 determines that the request to join the conference is a request from an audio-only caller.

While not specifically shown in the FIG. 6, the identification software 402 can determine using the information from the information collection tool 406 of FIG. 4 that an audio-based identification message is to be used for obtaining the identity of the audio-only caller. For example, the identification software 402 may determine that the first phone 601 is a shared device. As such, at 608, the identification software 402 can transmit an audio request to the first phone 601 requesting that the audio-only caller provide a personal phone number (i.e., a phone number of the second phone 603). To illustrate, and without limitations, the audio request for the phone number can be a prompt along the lines of "Please enter a phone number to which we can send you a message to obtain your name."

At 610, the first phone 601 transmits a response received from the audio-only caller to the audio request for a phone number. The response can be an audio response that includes the phone number, which the audio-only caller can speak into the microphone of, or connected to, the first phone 601. Alternatively, the audio-only caller may use the keypad of the first phone 601 to enter the phone number. At 612, the identification software 402 receives the phone number from the first phone 601. The phone number is the number of the second phone 603.

At 614, the identification software 402 transmits an identification request to the second phone 603. The identification request can be as described with respect to FIG. 5. As such, the identification request can be a text-based or an audio-request. At 616, and as described with respect to 510 of FIG. 5, the second phone 603 transmits a response received from the audio-only caller to the identification software 402. At 618, and as described with respect to 512 of FIG. 5, the identification software 402 receives the identity or receives other information that can be used to obtain the identity of the audio-only caller. An arrow 617 illustrates, and as described with the arrow 511 of FIG. 5, that the response to the identification request may be received from an entity other than the second phone 603.

At 620, and as described with respect to 514 of FIG. 5, the identity of the audio-only caller is displayed in a user interface associated with the conference. As also described with respect to FIG. 5, the identification software 402 can associate the verified identity of the audio-only caller with the second phone 603, such as in the phone data database 412. As also described with respect to FIG. 5, the audio-only caller may or may not be joined to the conference in the case that the identification software 402 is not be able to verify the identity of the audio-only caller.

To further describe some implementations in greater detail, reference is next made to examples of techniques which may be performed for audio conference participant identification.

Figure 7:
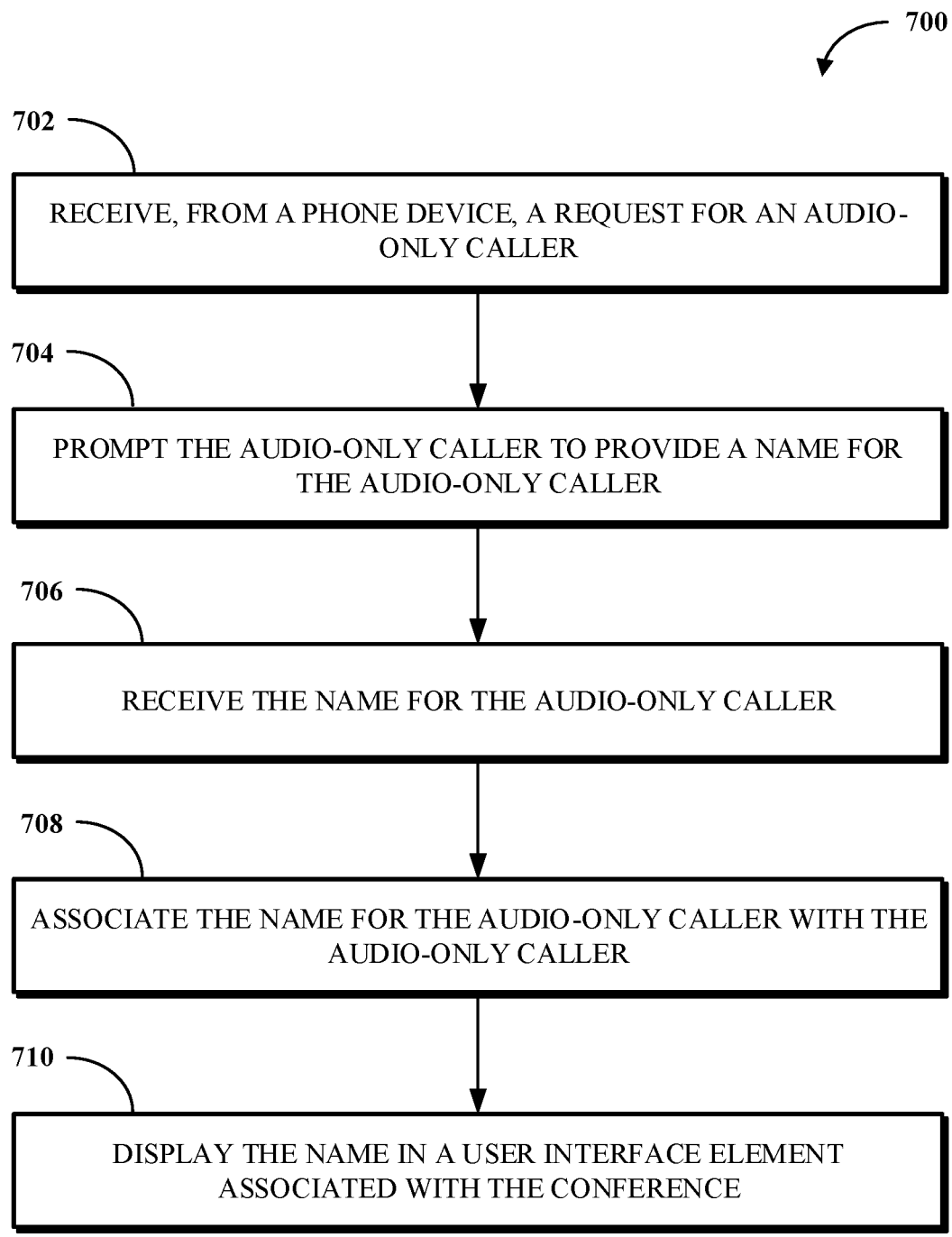
FIG. 7 is a flowchart of an example of a technique for obtaining an identity of an audio-only caller to a conference.

FIG. 7 is a flowchart of an example of a technique 700 for obtaining an identity of an audio-only caller to a conference. The technique 700 can be executed using computing devices, such as the systems, hardware, and software described with respect to FIGS. 1-6. The technique 700 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 204 of FIG. 2. The steps, or operations, of the technique 700 or another technique, method, process, or algorithm described in connection with the implementations disclosed herein can be implemented directly in hardware, firmware, software executed by hardware, circuitry, or a combination thereof.

At 702, the technique 700 receives, from a phone device, a request for an audio-only caller to join a conference, as described above. The phone device can be the phone 400 of FIG. 4 or FIG. 5 or the first phone 601 of FIG. 6. At 704, the technique 700 prompts the audio-only caller to provide a name (i.e., name information) for the audio-only caller, as described above. In an example, the technique 700 can prompt the audio-only caller before the audio-only caller is joined to the conference. In an example, the technique 700 can prompt the audio-only caller after the audio-only caller is joined to the conference. The technique 700 can select a prompting mechanism (e.g., modality) based on a type of a phone line associated with the phone device, such as whether the phone line is a landline or a cellular phone. That the phone line is a cellular phone can indicate that the phone device is capable of receiving text-based messages, including text-based identification requests.

In an example, and as described above, prompting the audio-only caller to provide the name for the audio-only caller can include, responsive to determining that the phone device is a mobile phone, prompting, using a text-based message, the audio-only caller to provide the name. The text-based message can be as described above. In an example, prompting the audio-only caller to provide the name for the audio-only caller can include, responsive to determining that the phone device is a landline (i.e., that the phone line associated with the phone device), prompting, using an audio message, the audio-only caller to provide the name.

In an example, and as described above, prompting the audio-only caller to provide the name for the audio-only caller can include prompting the audio-only caller to provide a personal phone number; and sending, to a device associated with the personal phone number, an identification request for the name for the audio-only caller.

At 706, the technique 700 receives the name for the audio-only caller. In an example, receiving the name for the audio-only caller can include receiving, from the phone device, a voice response; and obtaining the name from the voice response using speech-to-text, such as by transcribing the voice response. In an example, receiving the name for the audio-only caller can include receiving, from the phone device, a textual response that includes the name, as described above.

At 708, the technique 700 associates the name for the audio-only caller with the audio-only caller. In an example, the name can be associated with the audio-only caller for the purpose of displaying the name in a user interface associated with the conference. As such, at 710, the technique 700 displays (or causes to be displayed) the name in a user interface element associated with the conference. In the case that the audio-only caller is already joined to the conference, the technique 700 can replace, in the user interface, any generic label displayed for the audio-only caller (if any) with the name. In the case that the audio-only caller is not already joined to the conference, the technique 700 can join the user in the conference and display the name in the user interface.

Additionally, and in an example, the name can be associated with the phone device (or the phone number of the phone device) in a data store, such as the phone data database 412 of FIG. 4 or some other permanent data store. As such, in response to receiving, from the phone device, a second request for the audio-only caller to join a second conference, the technique 700 can retrieve the name associated with the audio-only caller from the data store, and displays the name in a second user interface associated with the second conference.

Figure 8:
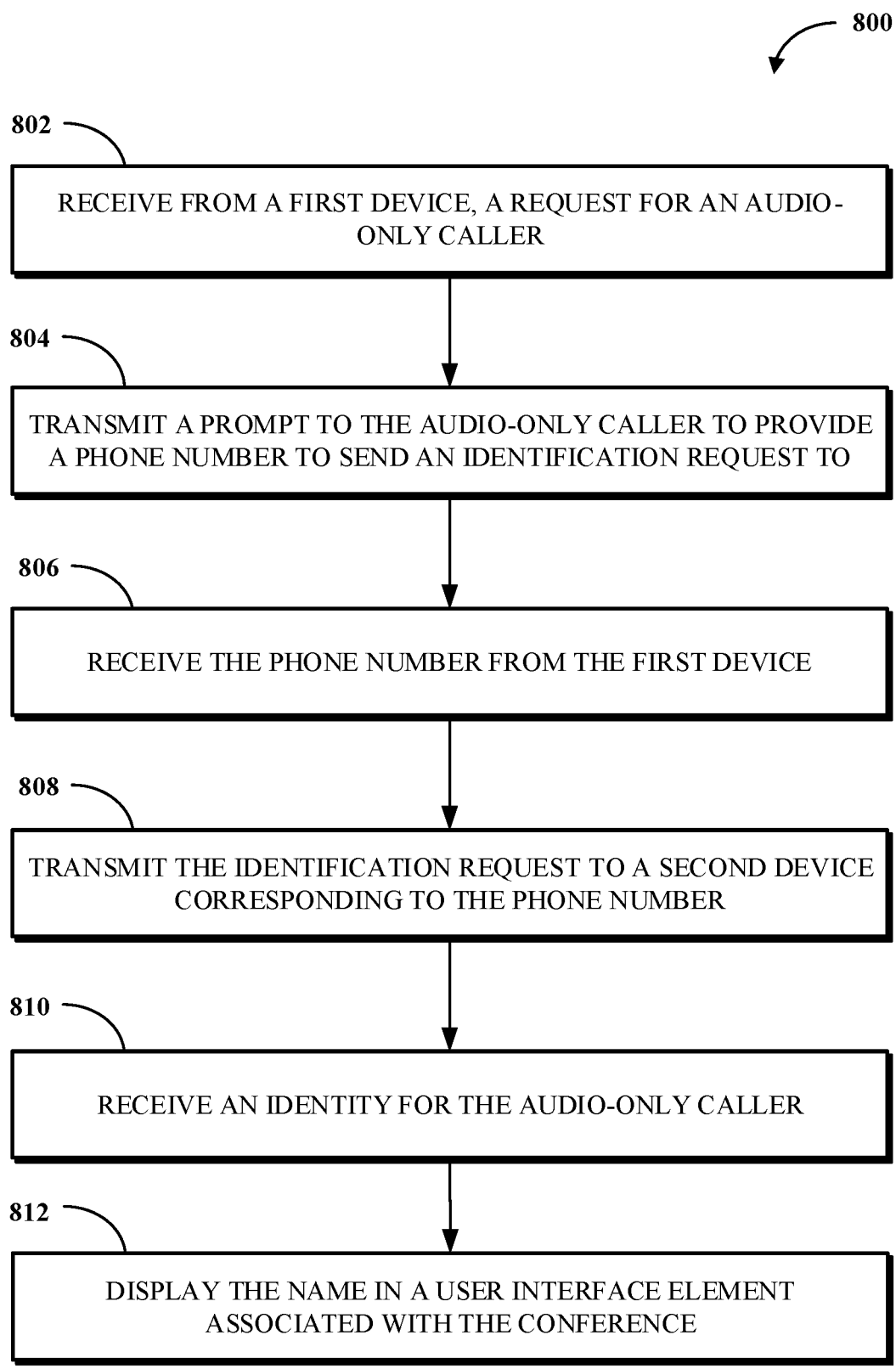
FIG. 8 is a flowchart of another example of a technique for obtaining an identity of an audio-only caller to a conference.

FIG. 8 is a flowchart of another example of a technique 800 for obtaining an identity of an audio-only caller to a conference. The technique 800 can be executed using computing devices, such as the systems, hardware, and software described with respect to FIGS. 1-6. The technique 800 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 204 of FIG. 2. The steps, or operations, of the technique 800 or another technique, method, process, or algorithm described in connection with the implementations disclosed herein can be implemented directly in hardware, firmware, software executed by hardware, circuitry, or a combination thereof.

At 802, the technique 800 receives from a first device, a request for an audio-only caller to join a conference. At 804, the technique 800 transmits a prompt to the audio-only caller to provide a phone number to send an identification request to. In an example, the technique 800 can transmit the prompt to the audio-only caller before the audio-only caller is joined to the conference. In an example, the technique 800 can transmit the prompt to the audio-only caller after the audio-only caller is joined to the conference. At 806, the technique 800 receives the phone number from the first device. At 808, the technique 800 transmits the identification request to a second device corresponding to the phone number. In an example, the technique 800 transmits the identification request in a text-based message, which can be an SMS message.

At 810, the technique 800 receives an identity of the audio-only caller. In an example, the identity can be received in an audio response. In an example, the technique 800 can further include obtaining a voice fingerprint of the identity based on the audio response, and associating (in a data store, such as in the phone data database 412 of FIG. 4 or some other data store) the voice fingerprint with the identity.

As mentioned above, when a participant joins a conference, the participant may be prompted to speak his or her name (i.e., a verbal announcement) so that the participant can be announced to all other participants. As such, the technique 800 can further include receiving a request for a user to join a conference; receive a verbal announcement of the user; obtain a fingerprint of the verbal announcement; and, responsive to determining that the voice fingerprint matches the fingerprint of the verbal announcement, associating the identity with the user in a user interface associated with the conference. That is, the previously stored audio fingerprint of the identity of the user can be matched to the verbal announcement to retrieve the identity, which is then displayed in the user interface. For example, the technique 800 can query (e.g., search, etc.) the data store for any audio fingerprints that match the fingerprint of the verbal announcement. If a matching audio fingerprint is found (e.g., identified, etc.), the identity associated with the matched audio fingerprint can be retrieved and can be assumed to be an identity of the user.

At 812, the technique 800 displays the name (i.e., identity) in a user interface element associated with the conference. For example, in the case that the audio-only caller is already joined to the conference, the technique 800 can replace, in the user interface, any generic label displayed for the audio-only caller (if any) with the identity. In the case that the audio-only caller is not already joined to the conference, the technique 800 can join the user in the conference and display the identity in the user interface.

In an example, the technique 800 can further include associating, in a data store (such as the phone data database 412 of FIG. 4 or some other data store, the identity of the audio-only caller with the phone number; and, responsive to receiving, from the second device corresponding to the phone number, a second request to join a second conference, display the identity of the audio-only caller in a second user interface associated with the second conference.

Figure 9:
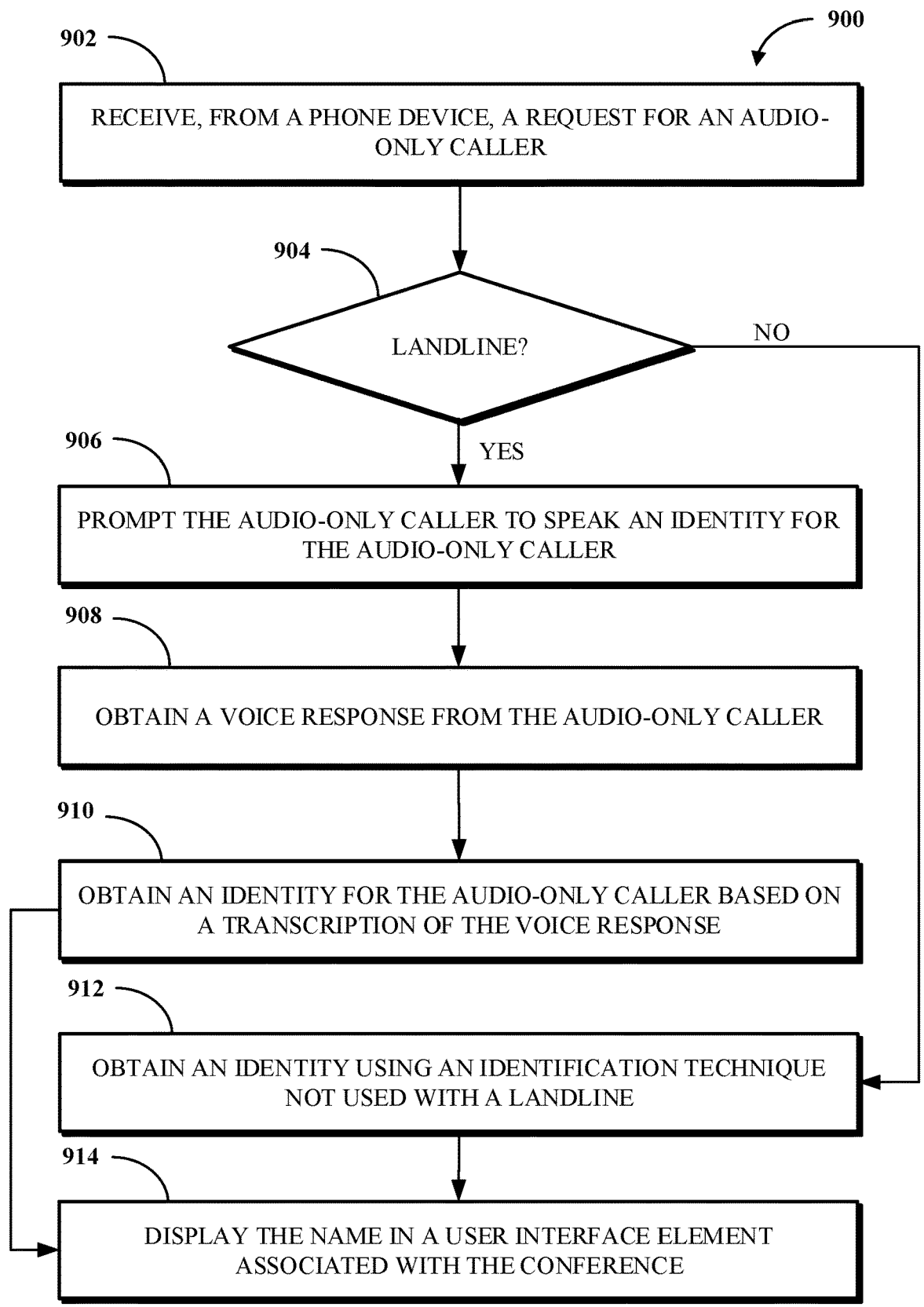
FIG. 9 is a flowchart of another example of a technique for obtaining an identity of an audio-only caller to a conference.

FIG. 9 is a flowchart of another example of a technique 900 for obtaining an identity of an audio-only caller to a conference. The technique 900 can be executed using computing devices, such as the systems, hardware, and software described with respect to FIGS. 1-6. The technique 900 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 204 of FIG. 2. The steps, or operations, of the technique 900 or another technique, method, process, or algorithm described in connection with the implementations disclosed herein can be implemented directly in hardware, firmware, software executed by hardware, circuitry, or a combination thereof.

At 902, the technique 900 receives, from a phone device, a request for an audio-only caller to join a conference. At 904, the technique 900 determines whether a phone number associated with the phone device is a landline. If the phone number is a landline, the technique 900 proceeds to 906; otherwise, the technique 900 proceeds to 912 to obtain the identity using another identification technique described herein, such as obtaining the identity in a case that the phone is a mobile phone.

At 906, the technique 900 prompts the audio-only caller to speak an identity of the audio-only caller. In an example, the technique 900 can prompt the audio-only caller before the audio-only caller is joined to the conference. In an example, the technique 900 can prompt the audio-only caller after the audio-only caller is joined to the conference. At 908, the technique 900 obtains a voice response from the audio-only caller. At 910, the technique 900 obtains an identity of the audio-only caller based on a transcription of the voice response. At 914, the technique 900 displays the name (i.e., identify) in a user interface element associated with the conference. In the case that the audio-only caller is already joined to the conference, the technique 900 can replace, in the user interface, any generic label displayed for the audio-only caller (if any) with the identity. In the case that the audio-only caller is not already joined to the conference, the technique 900 can join the user in the conference and display the name in the user interface.

In an example, responsive to determining that the phone device is a shared device, the technique 900 obtains a second phone number from the audio-only caller; transmits an identification request to a device associated with the second number; and obtains a response to the identification request, wherein the request comprises the identity. The identification request can be a text-based identification request. The response to the identification request can be a text-based response. The response to the identification request can be an audio-based response.

Figure 10:
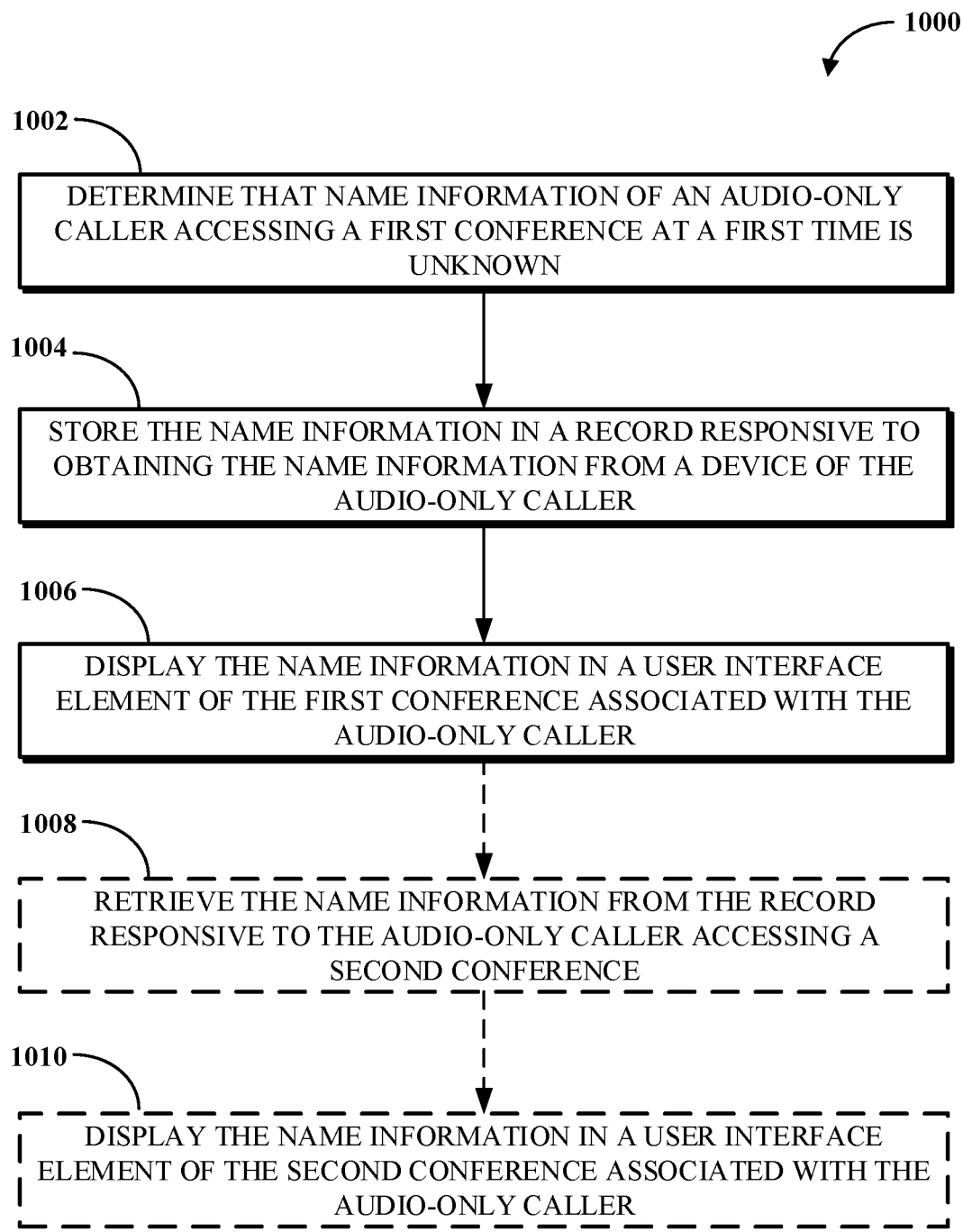
FIG. 10 is a flowchart of an example of a technique for displaying name information of an audio-only caller to a conference in a user interface associated with the conference.

FIG. 10 is a flowchart of an example of a technique 1000 for displaying name information of an audio-only caller to a conference in a user interface associated with the conference. The technique 1000 can be executed using computing devices, such as the systems, hardware, and software described with respect to FIGS. 1-6. The technique 1000 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 204 of FIG. 2. The steps, or operations, of the technique 1000 or another technique, method, process, or algorithm described in connection with the implementations disclosed herein can be implemented directly in hardware, firmware, software executed by hardware, circuitry, or a combination thereof.

At 1002, the technique 1000 determines that name information of an audio-only caller accessing a first conference at a first time is unknown. In an example, and as described above, a request to join the first conference may be received from the audio-only caller. More specifically, the request may be received from a device of the of the audio-only caller. In an example, and as described above, the technique 1000 can join the audio-only user to the conference prior to determining that the name information is unknown. As such, the name information can be obtained after the audio-only caller joins the first conference. In an example, and as also described above, the technique 1000 can determine that the name information is unknown prior to joining the audio-only user to the conference prior to the conference. As such, the name information can be obtained before the audio-only caller joins the first conference. The technique 1000 can determine that the name information is unknown responsive to a determination that a database, such as the phone data database 412 of FIG. 4, does not include data associated with the device. For example, the database may not include data associated with a phone number of the device. In an example, the technique 1000 determines that name information is unknown responsive to a determination that the database does not include an association between the device and name information.

At 1004, the technique 1000 store the name information in a record responsive to obtaining the name information from a device of the audio-only caller. As described above, the technique 1000 can transmit an identification request to the device.

The name information can be obtained from the device of the audio-only caller based on a device type of the device. That is, the type of the identification request can depend on the type of the device. As described above, the device type can be a mobile phone and the technique 1000 can transmit a text-based message to the device to prompt the audio-only caller to provide the name information and obtain the name information by processing a text response to the text-based message received from the device. As described above, the device type can be a landline phone, and the technique 1000 can transmit an audio-based message over a telephony connection with the device to prompt the audio-only caller to provide the name information, and obtain the name information by processing an audio response to the audio message received from the device. In an example, and as described above, obtaining the name information by processing the audio response to the audio message received from the device can include using automated speech recognition to determine the name information within the audio response.

At 1006, the technique 1000 displays the name information in a user interface element of the first conference where the user interface element is associated with the audio-only caller. The user interface element can be list item (such as an item in a list of conference participants). The list can be a graphical, textual, or some other type of list. Other user interface elements are possible.

In an implementation, the technique 1000 can further include retrieving 1008 the name information from the record responsive to the audio-only caller accessing a second conference at a second time after the first time; and displaying 1010 the name information in a user interface element of the second conference associated with the audio-only caller. As described above, retrieving the name information from the record responsive to the audio-only caller accessing the second conference at the second time after the first time can include identifying a telephone number associated with a request received from the device of the audio-only caller and accessing the record based on an association between the name information and the telephone number.

In an example, the technique 1000 can further include prompting the audio-only caller to record a voice fingerprint responsive to obtaining the name information from the device. In an example, subsequent to receiving the text response to the text-based message, the technique 1000 can-prompt the audio-only caller to record a voice fingerprint. More specifically, the technique 1000 can prompt the audio-only caller to record an audio response that the technique 1000 can use to obtain the voice fingerprint. In an example, the technique 1000 can use the audio response that is obtained in response to audio-based message to obtain the voice fingerprint. The technique 1000 can store the voice fingerprint in connection with the record. As such, and as described above, retrieving the name information from the record responsive to the audio-only caller accessing the second conference at the second time after the first time can include prompting the audio-only caller to provide audio input responsive to a request to access the second conference received from the device, and retrieving the name information from the record based on a match between the audio input and the voice fingerprint.

Figure 11:
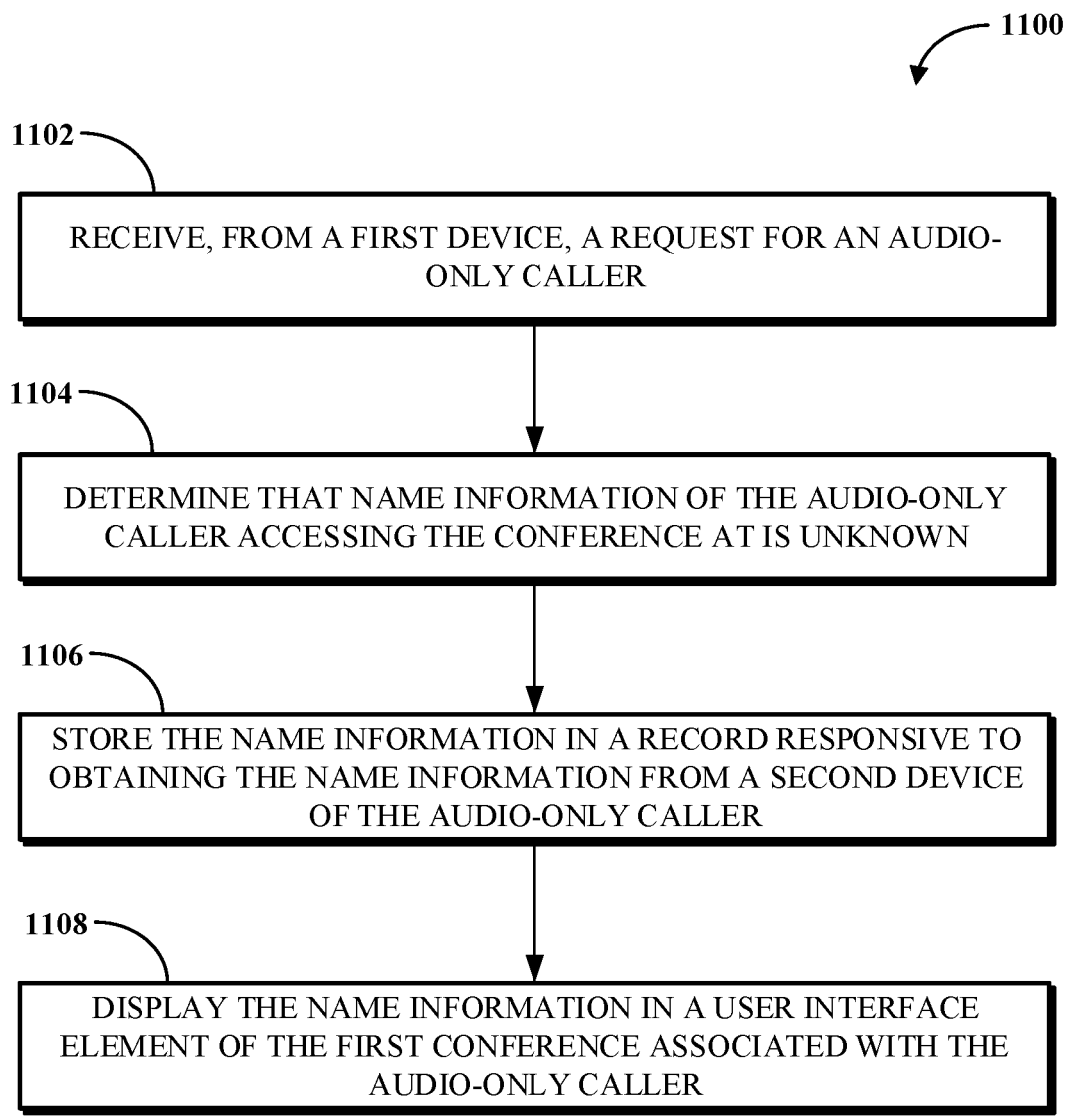
FIG. 11 is a flowchart of another example of a technique for displaying name information of an audio-only caller to a conference in a user interface associated with the conference.

FIG. 11 is a flowchart of another example of a technique 1100 for displaying name information of an audio-only caller to a conference in a user interface associated with the conference. The technique 1100 can be executed using computing devices, such as the systems, hardware, and software described with respect to FIGS. 1-6. The technique 1100 can be performed, for example, by executing (such as by the processor 202 of FIG. 2) a machine-readable program or other computer-executable instructions, such as routines, instructions, programs, or other code, which may be stored in a non-transitory computer-readable storage medium, such as the memory 204 of FIG. 2. The steps, or operations, of the technique 1100 or another technique, method, process, or algorithm described in connection with the implementations disclosed herein can be implemented directly in hardware, firmware, software executed by hardware, circuitry, or a combination thereof.

At 1102, the technique 1100 receives from a first device, a request for an audio-only caller to join a conference. The request can be received as described above. At 1104, the technique 1100 determines that name information of the audio-only caller accessing the conference at is unknown. The name information can be determined to be unknown as described above. In an example, the name information can be determined to be unknown before the audio-only caller is joined to the conference. In an example, the name information can be determined to be unknown after the audio-only caller is joined to the conference.

At 1106, the technique 1100 stores the name information in a record responsive to obtaining the name information from a second device of the audio-only caller. As described above, in an example, the name information can be obtained after the audio-only caller joins the conference; and in another example, the name information can be obtained before the audio-only caller joins the conference. At 1108, the technique 1100 displays the name information in a user interface element of the conference associated with the audio-only caller. In the case that the audio-only caller is already joined to the conference, the technique 1100 can replace, in the user interface, any generic label displayed for the audio-only caller (if any) with the name information. In the case that the audio-only caller is not already joined to the conference, the technique 1100 can join the user in the conference and display the name information in the user interface.

In an example, and as described above, the name information can be obtained from the second device of the audio-only caller based on determination that the first device is a landline phone. In an example, the technique 1100 can transmit an audio-based message over a telephony connection with the first device to prompt the audio-only caller to provide a number for the second device. The technique 1100 can transmit a text-based message to the second device to prompt the audio-only caller to provide the name information and obtain the name information by processing a text response to the text-based message received from the second device.

In an example, the conference can be a first conference that is accessed by the audio-only caller at a first time and the technique 1100 can further include, as described above, retrieving the name information from the record responsive to the audio-only caller accessing a second conference at a second time after the first time, and displaying the name information in a user interface element of the second conference associated with the audio-only caller. Retrieve the name information from the record responsive to the audio-only caller accessing the second conference at the second time after the first time can include identifying a telephone number associated with a request received from the first device of the audio-only caller, and accessing the record based on an association between the name information and the telephone number.

The technique 1100 can further include prompting the audio-only caller to record a voice fingerprint responsive to obtaining the name information from the second device, and storing the voice fingerprint in connection with the record. Retrieving the name information from the record responsive to the audio-only caller accessing the second conference at the second time after the first time can include prompting the audio-only caller to provide audio input responsive to a request to access the second conference received; and retrieving the name information from the record based on a match between the audio input and the voice fingerprint.

For simplicity of explanation, the techniques 700, 800, 900, 1000, and 1100 of FIGS. 7, 8, 9, 10, and 11 respectively, are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, by a conferencing software, that an audio-only caller is accessing a conference using a landline phone;
   in response to the determination that the audio-only caller is accessing the conference using the landline phone, prompting, via a text-based message, the audio-only caller to provide name information;
   receiving, by the conferencing software, a response to the text-based message that includes the name information; and
   displaying the name information in a graphical user interface associated with the conference.

2. The method of claim 1, wherein the text-based message is transmitted to a mobile phone associated with the audio-only caller.

3. The method of claim 1, further comprising:
   transmitting a request that includes a phone number associated with the landline phone to a Location Routing Number (LRN) database to determine a type of the landline phone.

4. The method of claim 1, further comprising:
   performing a reverse phone number lookup using a phone number associated with the landline phone to determine a type of the landline phone.

5. The method of claim 1, wherein the name information is obtained from the response using speech-to-text processing.

6. The method of claim 1, further comprising:
   prompting the audio-only caller to record a voice fingerprint; and
   storing the voice fingerprint in association with a number of a phone to which the text-based message is transmitted.

7. The method of claim 1, further comprising:
transmitting an audio-based message over a telephony connection with the landline phone to the audio-only caller to request a number for a telephone to which to transmit the text-based message.

8. The method of claim 1, wherein the landline phone is a shared device.

9. A device, comprising:
a memory; and
a processor, the processor configured to:
determine that an audio-only caller is accessing a conference using a landline phone;
in response to the determination that the audio-only caller is accessing the conference using the landline phone, prompt, via a text-based message, the audio-only caller to provide name information;
receive a response to the text-based message that includes the name information; and
display the name information in a graphical user interface associated with the conference.

10. The device of claim 9, wherein the text-based message is transmitted to a mobile phone associated with the audio-only caller.

11. The device of claim 9, wherein the processor is further configured to execute instructions stored in the memory to:
transmit a request that includes a phone number associated with the landline phone to a Location Routing Number (LRN) database to determine a type of the landline phone.

12. The device of claim 9, the processor is further configured to execute instructions stored in the memory to:
perform a reverse phone number lookup using a phone number associated with the landline phone to determine a type of the landline phone.

13. The device of claim 9, wherein the name information is obtained from the response using speech-to-text processing.

14. The device of claim 9, wherein the processor is further configured to execute instructions stored in the memory to:
prompt the audio-only caller to record a voice fingerprint; and
store the voice fingerprint in association with a number of a phone to which the text-based message is transmitted.

15. The device of claim 9, wherein the processor is further configured to execute instructions stored in the memory to:
transmit an audio-based message over a telephony connection with the landline phone to the audio-only caller to request a number for a phone to which to transmit the text-based message.

16. The device of claim 9, wherein the landline phone is a shared device.

17. A non-transitory computer-readable storage medium storing instructions operable to cause one or more processors to perform operations comprising:
determining that an audio-only caller is accessing a conference using a landline phone;
in response to the determination that the audio-only caller is accessing the conference using the landline phone, prompting, via a text-based message, the audio-only caller to provide name information;
receiving a response to the text-based message that includes the name information; and
displaying the name information in a graphical user interface associated with the conference.

18. The non-transitory computer-readable storage medium of claim 17, wherein the text-based message is transmitted to a mobile phone associated with the audio-only caller.

19. The non-transitory computer-readable storage medium of claim 17, the operations further comprising:
transmitting a request that includes a phone number associated with the landline phone to a Location Routing Number (LRN) database to determine a type of the landline phone.

20. The non-transitory computer-readable storage medium of claim 17, wherein the name information is obtained from the response using speech-to-text processing.

* * * * *